US012669898B2

(12) United States Patent (10) Patent No.: US 12,669,898 B2
Sin et al. (45) Date of Patent: Jun. 30, 2026

(54) DISPLAY DEVICE INCLUDING TOUCH DRIVERS, AND TOUCH DEVICE

(71) Applicant: SAMSUNG DISPLAY CO., LTD., Yongin-si (KR)

(72) Inventors: Yu Jin Sin, Yongin-si (KR); Jae Hyun Park, Yongin-si (KR); Il Ho Lee, Yongin-si (KR); Hyun Wook Cho, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/678,005

(22) Filed: May 30, 2024

(65) Prior Publication Data

US 2025/0156012 A1 May 15, 2025

(30) Foreign Application Priority Data

Nov. 9, 2023 (KR) ........................ 10-2023-0154439

(51) Int. Cl.
*G06F 3/041* (2006.01)
*G06F 3/14* (2006.01)
(52) U.S. Cl.
CPC ........ *G06F 3/04184* (2019.05); *G06F 3/0412* (2013.01); *G06F 3/1446* (2013.01)
(58) Field of Classification Search
CPC .............. G06F 3/04166; G06F 3/1446; G06F 3/04184; G06F 3/0412
See application file for complete search history.

(56) References Cited

U.S. PATENT DOCUMENTS

| | | | |
|---|---|---|---|
| 9,904,420 B2 | 2/2018 | Kim et al. | |
| 10,133,417 B2 | 11/2018 | Seo et al. | |
| 11,144,143 B2 | 10/2021 | Kim et al. | |
| 11,366,546 B2 | 6/2022 | Lee et al. | |
| 2006/0103635 A1 | 5/2006 | Park | |
| 2014/0184533 A1* | 7/2014 | Park | G06F 3/04184 |
| | | | 345/173 |
| 2015/0339967 A1* | 11/2015 | Shin | G09G 3/2003 |
| | | | 345/690 |
| 2017/0046007 A1 | 2/2017 | Kitagawa et al. | |

(Continued)

FOREIGN PATENT DOCUMENTS

| | | |
|---|---|---|
| KR | 10-0644650 | 11/2006 |
| KR | 10-1426376 | 7/2014 |

(Continued)

*Primary Examiner* — Yaron Cohen
(74) *Attorney, Agent, or Firm* — F. CHAU & ASSOCIATES, LLC

(57) ABSTRACT

A display device includes a first display panel, a second display panel disposed adjacent to the first display panel, a first touch array disposed on the first display panel, a second touch array disposed on the second display panel, a first touch driver that applies a first touch driving signal to the first touch array in response to a frame synchronization signal, a second touch driver that applies a second touch driving signal to the second touch array in response to the frame synchronization signal, and a common line commonly connected to the first and second touch drivers to transmit the frame synchronization signal, and pulses included in the first touch driving signal and pulses included in the second touch driving signal have phases opposite to each other.

20 Claims, 10 Drawing Sheets

(56)            References Cited

U.S. PATENT DOCUMENTS

2021/0200414 A1*   7/2021  Lee ...................... G06F 3/0418
2023/0117610 A1     4/2023  Shin et al.
2023/0185401 A1     6/2023  Lee

FOREIGN PATENT DOCUMENTS

KR          10-2092569       3/2020
KR      10-2021-0086332      7/2021
KR          10-2349822       1/2022
KR      10-2023-0055328      4/2023
KR          10-2591836      10/2023

* cited by examiner

CONTROLLER

DISPLAY DEVICE INCLUDING TOUCH DRIVERS, AND TOUCH DEVICE

CROSS-REFERENCE TO RELATED APPLICATION

The present application claims priority under 35 U.S.C. § 119(a) to Korean Patent Application No. 10-2023-0154439 filed on Nov. 9, 2023 in the Korean Intellectual Property Office, the disclosure of which is incorporated by reference in its entirety herein.

1. TECHNICAL FIELD

The present disclosure relates to a display device and a touch device.

2. DISCUSSION OF RELATED ART

A display device is a connection medium between a user and information. Examples of the display device include an organic light emitting diode (OLED) display device and a liquid crystal display (LCD), are used.

Such a display device may include a touch sensing function capable of interacting with a user in addition to a function of displaying an image. When the user touches a screen with a finger or a touch pen, the display device may sense information such as a change in pressure, charge or light through the touch sensing function. The display device may determine touch information such as whether an object is touched on the screen or a touch position from the sensed information.

However, the touch sensing function may result in electronic magnetic interference (EMI) that reduces image quality or touch performance.

SUMMARY

Embodiments of the present disclosure may provide a display device and a touch device having increased quality.

According to an embodiment of the disclosure, a display device includes a first display panel, a second display panel, a first touch array, a second touch array, a first touch driver, a second touch driver, and a common line. The second display panel is disposed adjacent to the first display panel. The first touch array is disposed on the first display panel. The second touch array is disposed on the second display panel. The first touch driver applies a first touch driving signal to the first touch array in response to a frame synchronization signal. The second touch driver applies a second touch driving signal to the second touch array in response to the frame synchronization signal. The common line is commonly connected to the first and second touch drivers to transmit the frame synchronization signal. Pulses included in the first touch driving signal and pulses included in the second touch driving signal have phases opposite to each other.

The pulses included in the second touch driving signal may lag the phases of the pulses included in the first touch driving signal by 180 degrees.

The first and second touch driving signals may have the same pulse width.

Each of the first and second touch driving signals may include pulses toggled between a first voltage level and a second voltage level, and when the first touch driving signal transitions from the first voltage level to the second voltage level, the second touch driving signal may transition from the second voltage level to the first voltage level.

The first touch array may include touch electrodes, the touch electrodes may be divided into a plurality of touch electrode groups, the first touch driving signal may include a set of sub-touch driving signals, and each of the touch electrode groups may receive the set of sub-touch driving signals in different time periods among a plurality of time periods.

When one of the sub-touch driving signals has a first voltage level, remaining ones of the sub-touch driving signals may have a second voltage level.

The common line may include a first common line transmitting the frame synchronization signal and a second common line transmitting a pulse synchronization signal, and the first and second touch drivers may receive the frame synchronization signal through the first common line and the pulse synchronization signal through the second common line.

The first and second touch driving signals may be generated using pulses of the pulse synchronization signal.

The frame synchronization signal and the pulse synchronization signal may be pulse signals with different periods.

The first and second display panels may be disposed side by side in a first direction or in a second direction different from the first direction to display one image.

According to an embodiment of the disclosure, a touch device includes a first touch array, a second touch array, a first touch driver, a second touch driver and a common line. The first touch driver applies a first touch driving signal to the first touch array in response to a frame synchronization signal. The second touch driver applies a second touch driving signal to the second touch array in response to the frame synchronization signal. The common line is commonly connected to the first and second touch drivers to transmit the frame synchronization signal. Pulses included in the first touch driving signal and pulses included in the second touch driving signal have phases opposite to each other.

The pulses included in the second touch driving signal may lag the phases of the pulses included in the first touch driving signal by 180 degrees.

The first and second touch driving signals may have the same pulse width.

The common line may include a first common line transmitting the frame synchronization signal and a second common line transmitting a pulse synchronization signal, and the first and second touch drivers may receive the frame synchronization signal through the first common line and receive the pulse synchronization signal through the second common line.

The first and second touch driving signals may be generated using pulses of the pulse synchronization signal.

According to an embodiment of the disclosure, a touch device includes a first display panel, a second display panel, a first touch array, a second touch array, a first touch driver and a second touch driver. The second display panel is adjacent to the first display panel. The first touch array is disposed on the first display panel. The second touch array is disposed on the second display panel. The first touch driver applies a first touch driving signal to the first touch array in response to a frame synchronization signal. The second touch driver applies a second touch driving signal to the second touch array in response to the frame synchronization signal. When the first touch driving signal transitions from the first voltage level to the second voltage level, the second touch driving signal transitions from the second voltage level to the first voltage level.

BRIEF DESCRIPTION OF THE DRAWINGS

FIG. 1 is a perspective view illustrating a display device according to an embodiment of the disclosure;

FIG. 3 is a block diagram schematically illustrating an embodiment of display units including display panels of FIG. 1;

FIG. 5 is a block diagram schematically illustrating an embodiment of touch units including touch arrays of FIG. 1;

FIG. 7 is a block diagram illustrating an embodiment of a signal provided to first and second touch drivers of FIG. 5;

FIG. 8 is a timing diagram illustrating an embodiment of first and second touch driving signals applied to touch arrays of FIG. 7; and FIGS. 9 and 10 are timing diagrams illustrating an embodiment of the first and second touch driving signals applied to the touch arrays of FIG. 7.

DETAILED DESCRIPTION

Figure 2:
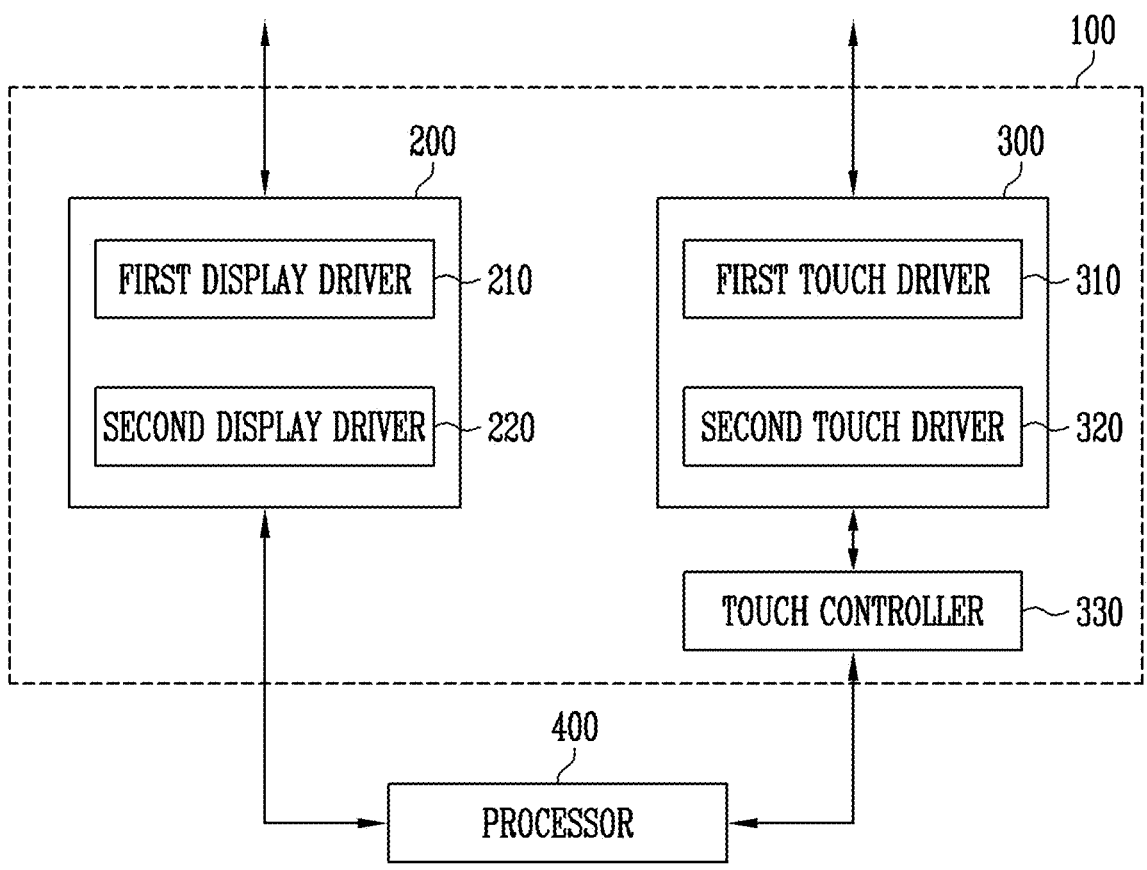
FIG. 2 is a block diagram illustrating an embodiment of a controller of FIG. 1.

Embodiments of the present disclosure will now be described more fully hereinafter with reference to the accompanying drawings. However, the present disclosure may be embodied in different forms and should not be construed as limited to the embodiments set forth herein.

It will be understood that when an element is referred to as being "between" two elements, it can be the only element between the two elements, or one or more intervening elements may also be present. Like reference numerals may refer to like elements throughout.

Throughout the specification, in a case where a portion is "connected" to another portion, the case includes not only a case where the portion is "directly connected" but also a case where the portion is "indirectly connected" with another element interposed therebetween. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Figure 1:
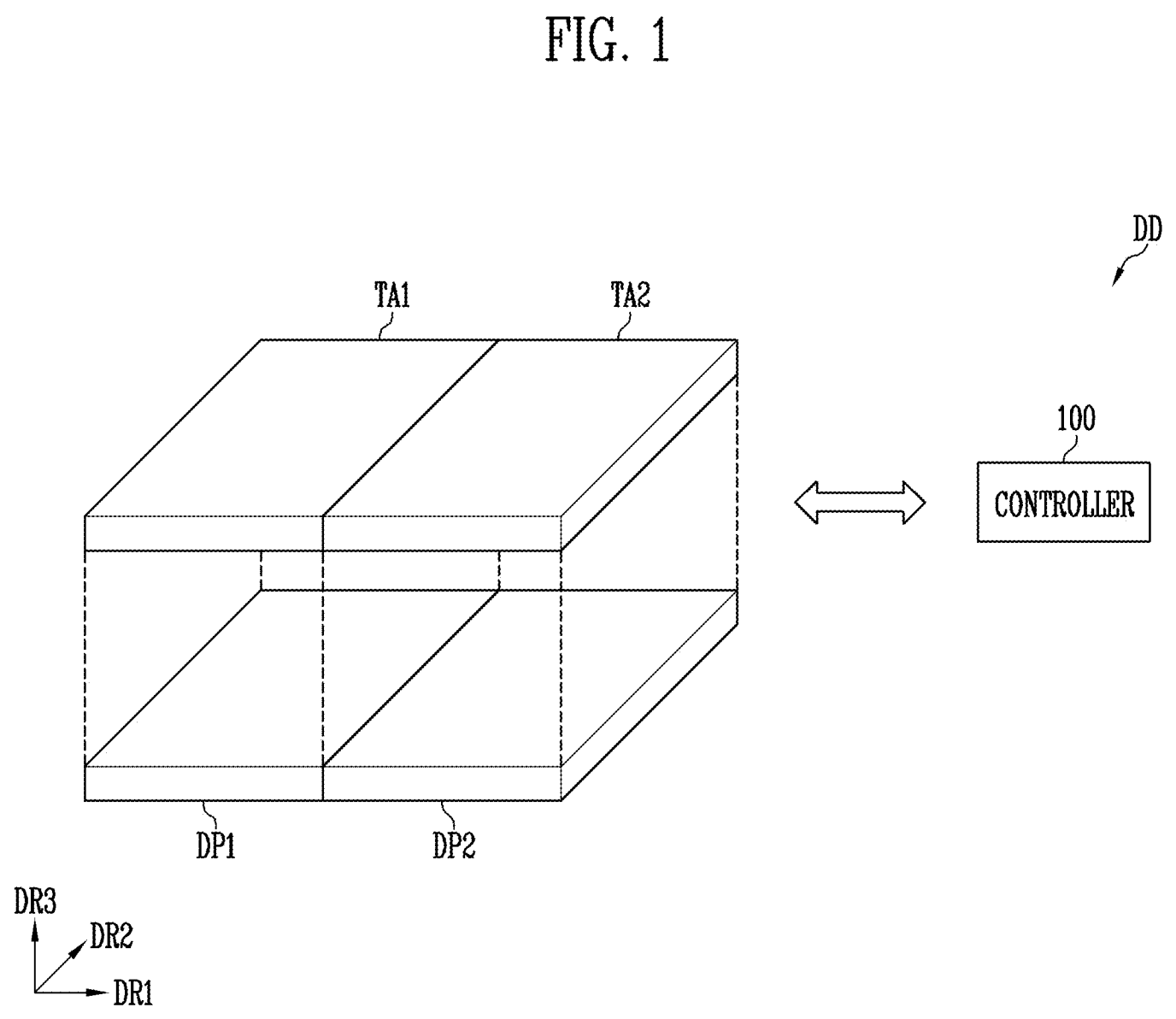

FIG. 1 is a perspective view illustrating a display device according to an embodiment of the disclosure.

Referring to FIG. 1, when the display device DD is an electronic device in which a display surface is applied to one surface and a plurality of display panels are connected and used, such as a smartphone, a television, a tablet personal computer (PC), a mobile phone, a video phone, a car navigation system, an e-book reader, a desktop PC, a laptop PC, a netbook computer, a workstation, a server, a personal digital assistant (PDA), a portable multimedia player (PMP), an MP3 player, a medical device, a camera, or a wearable, the disclosure may be applied to the display device DD.

The display device DD may include a first touch array TA1, a second touch array TA2, a first display panel DP1, and a second display panel DP2. In addition, the display device DD may further include a controller 100 (e.g., a controller circuit).

The display device DD may include the first and second touch arrays TA1 and TA2 for sensing touch, pressure, fingerprint, hovering, and the like, and the first and second display panels DP1 and DP2 for displaying an image.

In an embodiment of the disclosure, for convenience of description, in the display device DD, each of the first touch array TA1, the second touch array TA2, the first display panel DP1, and the second display panel DP2 may be shown as a rectangular shape having a pair of long sides and a pair of short sides. In addition, in this case, an extension direction of the long side may be indicated as a second direction DR2, an extension direction of the short side may be indicated as a first direction DR1, and a direction perpendicular to the extension direction of the long side and the short side may be indicated as a third direction DR3. The first to third directions DR1, DR2, and DR3 may refer to directions indicated by the first to third directions DR1, DR2, and DR3, respectively.

In FIG. 1, the display device DD is shown as including two first and second display panels DP1 and DP2, and two first and second touch arrays TA1 and TA2, but is not limited thereto. For example, the display device DD may include three or more display panels and three or more touch arrays.

Referring to FIG. 1, the first display panel DP1 and the second display panel DP2 may be disposed side by side in the first direction DR1. For example, the first display panel DP1 may be disposed adjacent to the second display panel DP2. In addition, the first touch array TA1 and the second touch array TA2 may overlap the first display panel DP1 and the second display panel DP2, respectively. However, the disclosure is not limited thereto. For example, the first touch array TA1 and the second touch array TA2 may be disposed side by side not only in the first direction DR1 but also in the second direction DR2.

In an embodiment, the first touch array TA1 is disposed on the first display panel DP1 in the third direction DR3. In addition, the second touch array TA2 may be disposed on the second display panel DP2 in the third direction DR3. In an embodiment, the first touch array TA1 may be disposed under the first display panel DP1. In addition, the second touch array TA2 may be disposed under the second display panel DP2.

The first and second display panels DP1 and DP2 and the first and second touch arrays TA1 and TA2 may be manufactured separately from each other and then combined so that at least one area overlaps each other. Alternatively, the first and second display panels DP1 and DP2 and the first and second touch arrays TA1 and TA2 may be manufactured integrally. For example, the first and second touch arrays TA1 and TA2 may be formed directly on at least one substrate configuring the first and second display panels DP1 and DP2 (for example, an upper and/or lower substrate of the display panel, or a thin film encapsulation (TFE) layer), another insulating layer, or various functional layers (for example, an optical layer or a protective layer).

In embodiments, the first and second display panels DP1 and DP2 may be implemented with a display panel capable of generating self-emitting light such as an organic light emitting display panel (OLED) panel using an organic light emitting diode as a light emitting element, an ultra-small light emitting display panel (nano-scale LED display panel) using an ultra-small light emitting diode as a light emitting element, and a quantum dot organic light emitting display panel (QD OLED panel) using a quantum dot and an organic light emitting diode. In addition, the first and second display panels DP1 and DP2 may be implemented with a non-emissive display panel such as a liquid crystal display panel (LCD) panel and an electro-phoretic display panel (EPD) panel. When the non-emissive display panels are used as the first and second display panels DP1 and DP2, the display device DD may include a backlight unit that supplies light to the display panel DP. However, this is an example and is not limited thereto.

In embodiments, the first and second touch arrays TA1 and TA2 may be implemented with the same type of touch array. In addition, the first and second touch arrays TA1 and TA2 may be implemented with a touch panel such as a capacitive type touch panel, a resistive type touch panel, an optical touch panel, a surface acoustic wave touch panel, a pressure touch panel, or a hybrid touch panel. However, this is an example and is not limited thereto.

The controller 100 may be connected to the first and second display panels DP1 and DP2 and the first and second touch arrays TA1 and TA2. The controller 100 may include a display driver 200 (refer to FIG. 2) and a touch driver 300 (refer to FIG. 2). As an example, the display driver 200 (e.g., a first driver circuit) may be electrically connected to the first and second display panels DP1 and DP2 to drive pixels. The touch driver 300 (e.g., a second driver circuit) may be electrically connected to the first and second touch arrays TA1 and TA2 to apply touch driving signals. The controller 100 may control an overall operation of the display device DD through the display driver 200 and the touch driver 300. Details about the controller 100 will be described later with reference to FIG. 2.

FIG. 2 is a block diagram illustrating an embodiment of the controller of FIG. 1.

Referring to FIG. 2, the controller 100 may include the display driver 200 and the touch driver 300. In addition, the controller 100 may further include a touch controller 330 (e.g., a controller circuit) for controlling the touch driver 300.

In an embodiment, the display driver 200 and the touch driver 300 may be configured of separate integrated chips (ICs) and may be driven independently. In another embodiment, the display driver 200 and the touch driver 300 may be at least partially integrated into one IC and driven in conjunction with each other.

The display driver 200 may control an image display operation of the first and second display panels DP1 and DP2. The display driver 200 may include a first display driver 210 (e.g., a first display driver circuit) for driving the first display panel DP1 and a second display driver 220 (e.g., a second display driver circuit) for driving the second display panel DP2. As an example, the first display driver 210 may control an image display operation of the first display panel DP1 by applying a driving signal to the first display panel DP1 (refer to FIG. 1). The second display driver 220 may control an image display operation of the second display panel DP2 by applying a driving signal to the second display panel DP2 (refer to FIG. 1).

The touch driver 300 may detect a touch position on the first and second touch arrays TA1 and TA2. The touch driver 300 may include a first touch driver 310 (e.g., a first touch driver circuit) for driving the first touch array TA1 and a second touch driver 320 (e.g., a second touch driver circuit) for driving the second touch array TA2. As an example, the first touch driver 310 may apply first touch driving signals to the first touch array TA1 (refer to FIG. 1) in response to a frame synchronization signal. The first touch driver 310 may detect the touch position on the first touch array TA1 using a first sensing signal received from the first touch array TA1. The first sensing signal may be received in response to the first touch driving signals. The second touch driver 320 may apply second touch driving signals to the second touch array TA2 (refer to FIG. 1) in response to the frame synchronization signal. The second touch driver 320 may detect the touch position on the second touch array using a second sensing signal received from the second touch array TA2. The second sensing signal may be received in response to the second touch driving signals.

The touch controller 330 may receive the detected touch position and transmit the detected touch position to the processor 400.

The touch controller 330 may apply the frame synchronization signal to the first and second touch drivers 310 and 320. In an embodiment, the touch controller 330 applies the frame synchronization signal through a common line commonly connected to the first and second touch drivers 310 and 320. The touch controller 330 may synchronize the first and second touch driving signals by commonly applying the frame synchronization signal to the first and second touch arrays TA1 and TA2. Accordingly, noise causing EMI interference that occurs when applying the first and second touch driving signals to the first and second touch arrays TA1 and TA2 may be reduced.

In an embodiment, the touch controller 330 may further apply a pulse synchronization signal through the common line.

While the touch controller 330 is illustrated in FIG. 2 as being configured separately from the touch driver 300, embodiments are not limited thereto. For example, the touch controller 330 may be included in at least one of the first and second touch drivers 310 and 320, or may be included in a processor 400 for the display device DD.

The processor 400 may receive the touch position from the touch controller 330 and perform various operations. For example, the processor 400 may process image data for display on the first and second display panels DP1 and DP2 according to the touch position. The processor 400 may transmit the processed image data to the display driver 200. For example, the processor 400 may be implemented with an integrated circuit (IC), an application processor (AP), a mobile AP, or a processor capable of controlling an operation of the display driver 200 and the touch driver 300, but is not limited thereto.

Figure 3:
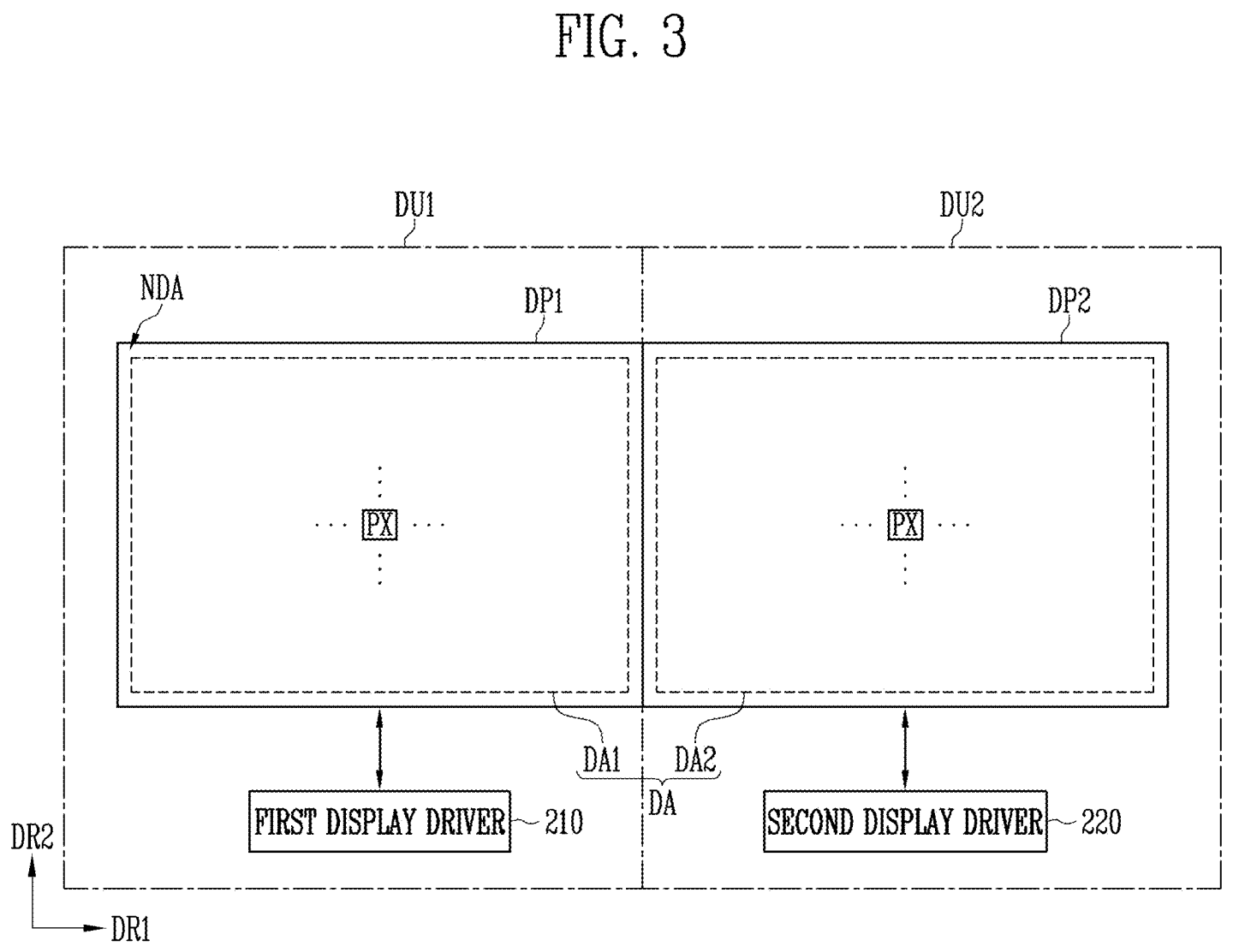

FIG. 3 is a block diagram schematically illustrating an embodiment of display units including the display panels of FIG. 1.

Referring to FIG. 3, the display device DD may include a first display unit DU1 and a second display unit DU2. In addition, the first display unit DU1 may include the first display panel DP1 and the first display driver 210 for driving the first display panel DP1. The second display unit DU2 may include the second display panel DP2 and the second display driver 220 for driving the second display panel DP2.

The first display panel DP1 of the first display unit DU1 and the second display panel DP2 of the second display unit DU2 may be physically connected to each other. The first and second display panels DP1 and DP2 may be disposed side by side in the first direction to divide and display one image. Alternatively, the first and second display panels DP1 and DP2 may be disposed side by side in the first direction to display different individual images.

Each of the first and second display panels DP1 and DP2 may include a display area DA where an image is displayed and a non-display area NDA outside the display area DA. According to embodiments, the first display panel DP1 may include a first display area DA1. The second display panel DP2 may include a second display area DA2. For example, the first display area DA1 may be disposed in a center area of the first display panel DP1, and the second display area DA2 may be disposed in a center area of the second display panel DP2. The non-display area NDA may be disposed at an edge area of the first and second display panels DP1 and DP2 to surround the display area DA.

In each of the first and second display areas DA1 and DA2, pixels PX, and scan lines SL1 to SLn (refer to FIG. 4) and data lines DL1 to DLm (refer to FIG. 4) electrically connected to the pixels PX 4 may be disposed.

The pixels PX may be configured to receive a data signal from the data lines DL1 to DLm based on a turn-on level of scan signal supplied from the scan lines SL1 to SLn and emit light of a luminance corresponding to the data signals. Accordingly, an image corresponding to the data signal may be displayed in the display area DA. However, the structure and driving method of the pixels PX are not limited thereto. For example, each of the pixels PX may be implemented with a pixel employing various structures and driving methods.

Various lines and/or a built-in circuit unit connected to the pixels PX of the display area DA may be disposed in the non-display area NDA. For example, a number of lines for supplying various power and control signals to the display area DA may be disposed in the non-display area NDA. In addition, the respective first and second display drivers 210 and 220 for driving the first and second display panels DP1 and DP2 may be disposed in the non-display area NDA.

The first display driver 210 may be electrically connected to the first display panel DP1 to drive the pixels PX of the first display area DA1. The second display driver 220 may be electrically connected to the second display panel DP2 to drive the pixels PX of the second display area DA2.

Figure 4:
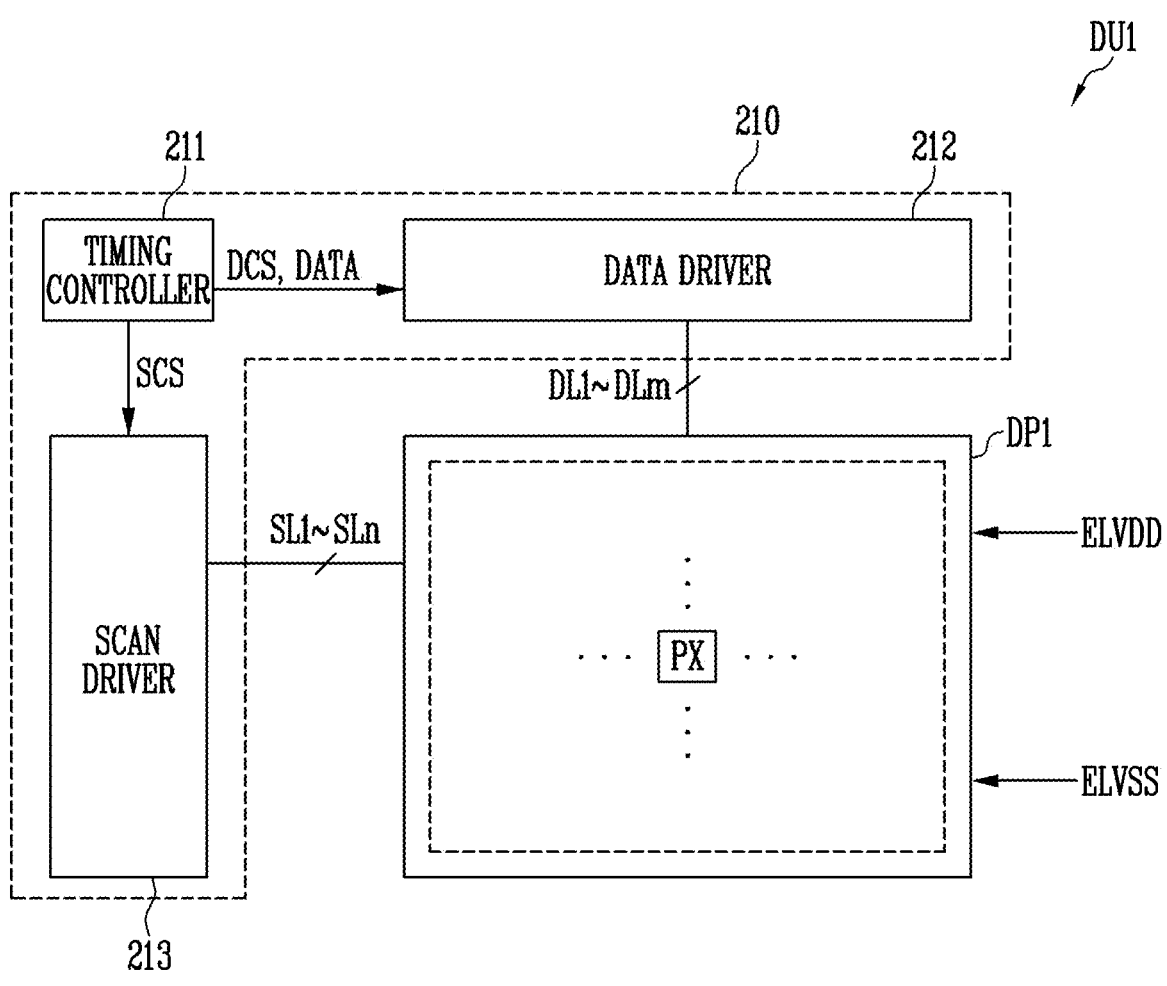
FIG. 4 is a block diagram illustrating an embodiment of one of the display units of FIG. 3.

FIG. 4 is a block diagram illustrating an embodiment of one of the display units of FIG. 3.

Referring to FIG. 4, the first display unit DU1 may include the first display panel DP1 and the first display driver 210. In addition, the first display driver 210 may include a timing controller 211 (e.g., a controller circuit), a data driver 212 (e.g., a driver circuit), and a scan driver 213 (e.g., a driver circuit). Hereinafter, configurations of the first display unit DU1 are described, but these may also be applied to the second display unit DU2.

The timing controller 211 may generate control signals for controlling the data driver 212 and the scan driver 213 using an external input signal received from the processor 400 (refer to FIG. 2). For example, the control signals may include a scan driver control signal SCS for controlling the scan driver 213 and a data driver control signal DCS for controlling the data driver 212. The external input signal received from the processor 400 may include a signal including touch position information on the first touch array TA1 (refer to FIG. 1) in addition to image data.

The timing controller 211 may supply the scan driver control signal SCS to the scan driver 213 and supply the data driver control signal DCS to the data driver 212. In addition, the timing controller 211 may convert image data input from outside into an image data signal suitable for a specification of the data driver 212 and supply the image data signal to the data driver 212.

According to an embodiment, the first display panel DP1 may include pixels PX, and data lines DL1 to DLm (m is an integer equal to or greater than 2) and scan lines SL1 to SLn (n is defined independently of m and is an integer equal to or greater than 2) connected to the pixels PX.

The data driver 212 may receive the data driver control signal DCS and image data DATA from the timing controller 211 and generate a data signal. In addition, the data driver 212 may supply the generated data signal to the data lines DL1 to DLm. For connection to the data lines DL1 to DLm, the data driver 212 may be mounted directly on a substrate on which the pixels PX are formed, or may be connected to the substrate through a separate component such as a flexible circuit board.

The scan driver 213 may supply scan signals to the scan lines SL1 to SLn in response to the scan driver control signal SCS. For example, the scan driver 213 may sequentially supply the scan signals to the scan lines SL1 to SLn. For connection to the scan lines SL1 to SLn, the scan driver 213 may be mounted directly on the substrate on which the pixels PX are formed, or may be connected to the substrate through a separate component such as a flexible circuit board.

For example, when a scan signal is supplied to a specific scan line, some of the pixels PX connected to the specific scan line may receive the data signal transmitted from the data lines DL1 to DLm, and some of the pixels PX may emit light with a luminance corresponding to the supplied data signal.

Although the timing controller 211, the data driver 212, and the scan driver 213 are shown individually in FIG. 4, at least some of the components may be integrated as needed.

An electrode to which a voltage and/or a signal driving the first display panel DP1 is supplied may be referred to as a panel electrode. The panel electrode may be the data lines DL1 to DLm, the scan lines SL1 to SLn, a first power ELVDD or second power ELVSS. A driving voltage may be supplied to the panel electrode. For example, the pixels PX may generate light corresponding to the data signal by a current flowing from the first power ELVDD to the second power ELVSS through a light emitting element. The first power ELVDD may be a high potential voltage, and the second power ELVSS may be a low potential voltage.

Figure 5:
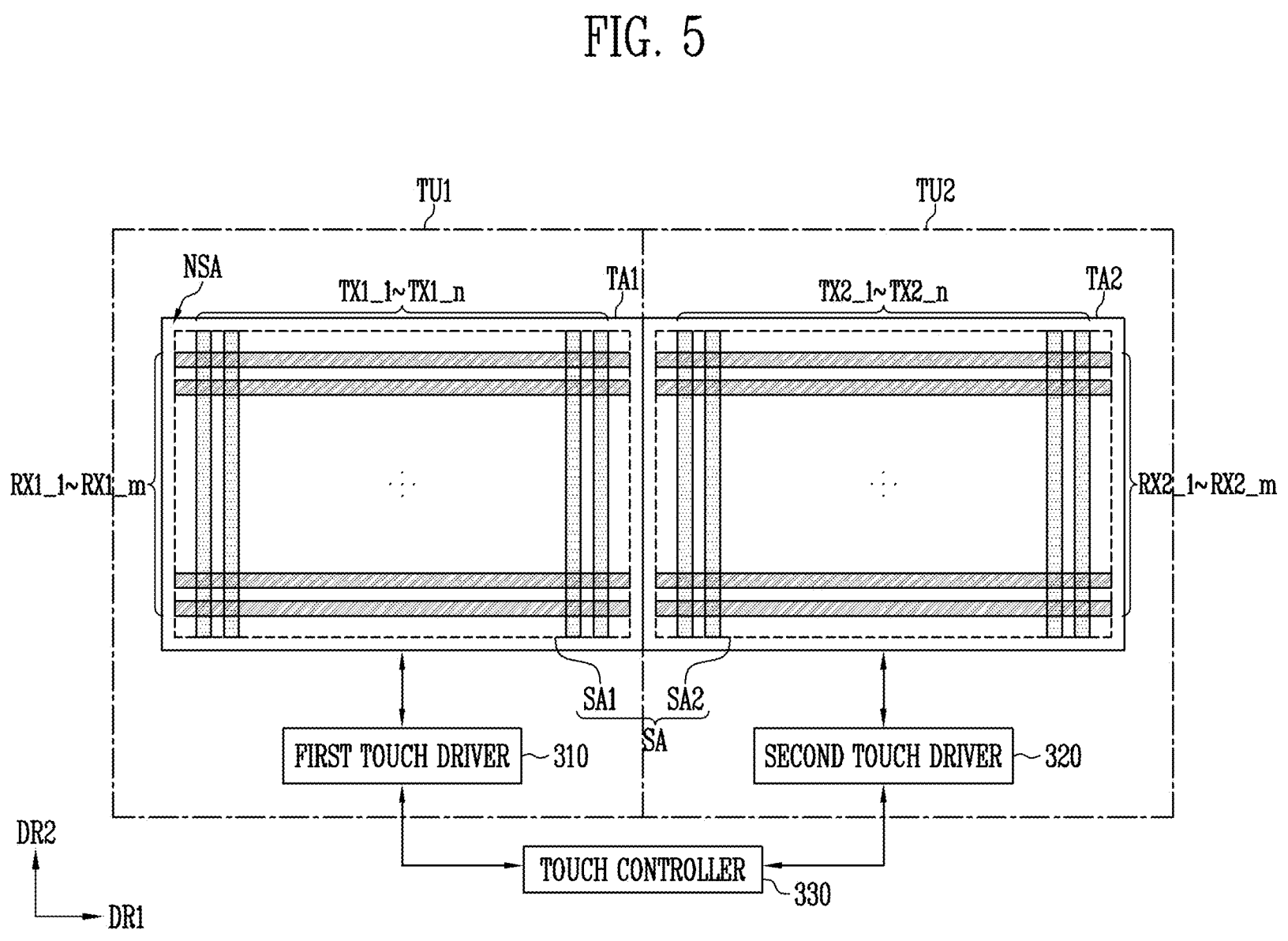

FIG. 5 is a block diagram schematically illustrating an embodiment of the touch units including the touch arrays of FIG. 1.

Referring to FIG. 5, the display device DD may include the first touch unit TU1 and the second touch unit TU2. In addition, the first touch unit TU1 may include the first touch array TA1 and the first touch driver 310 for driving the first touch array TA1. The second touch unit TU2 may include the second touch array TA2 and the second touch driver 320 for driving the second touch array TA2.

The first touch array TA1 of the first touch unit TU1 and the second touch array TA2 of the second touch unit TU2 may be physically connected to each other. The first and second touch arrays TA1 and TA2 may be disposed to overlap the first and second display panels DP1 and DP2 of FIG. 3, respectively. In addition, the first and second touch arrays TA1 and TA2 may detect the touch positions on the first and second touch arrays TA1 and TA2, respectively.

Each of the first and second touch arrays TA1 and TA2 may include a sensing area SA and a non-sensing area NSA outside the sensing area SA. According to embodiments, the first touch array TA1 may include a first sensing area SA1. The second touch array TA2 may include a second sensing area SA2. For example, the first sensing area SA1 may be disposed to overlap the first display area DA1 in a center area of the first touch array TA1. The second sensing area SA2 may be disposed to overlap the second display area DA2 in a center area of the second touch array TA2. The non-sensing area NSA may be disposed at an edge area of the first and second touch arrays TA1 and TA2 to surround the sensing area SA.

The sensing area SA is an area (i.e., an active area) capable of responding to a touch input. Touch electrodes and sensing electrodes for sensing the touch input may be disposed in the sensing area SA. For example, the touch electrodes and the sensing electrodes may be disposed to cross each other and sense the touch input in a mutual capacitance method or a self-capacitance method.

According to an embodiment, the first sensing area SA1 includes (1_1)-th to (1_n)-th touch electrodes TX1_1 to TX1_$n$ (n is an integer equal to or greater than 2) and (1_1)-th to (1_m)-th sensing electrodes RX1_1 to RX1_$m$ (m is defined independently of n and is an integer equal to or greater than 2). For example, the (1_1)-th to (1_n)-th touch electrodes TX1_1 to TX1_$n$ may be sequentially disposed along the first direction DR1 and may extend along the second direction DR2. Each of the (1_1)-th to (1_n)-th touch electrodes TX1_1 to TX1_$n$ may form a touch row. In addition, the (1_1)-th to (1_m)-th sensing electrodes RX1_1 to RX1_$m$ may be sequentially disposed along the second direction DR2 and may extend along the first direction DR1. Each of the (1_1)-th to (1_m)-th sensing electrodes RX1_1 to RX1_$m$ may form a sensing row.

The second sensing area SA2 may include (2_1)-th to (2_n)-th touch electrodes TX2_1 to TX2_$n$ and (2_1)-th to (2_m)-th sensing electrodes RX2_1 to RX2_$m$. For example, the (2_1)-th to (2_n)-th touch electrodes TX2_1 to TX2_$n$ may be sequentially disposed along the first direction DR1 and may extend along the second direction DR2. In addition, the (2_1)-th to (2_m)-th sensing electrodes RX2_1 to RX2_$m$ may be sequentially disposed along the second direction DR2 and may extend along the first direction DR1.

Touch electrode lines TXL (refer to FIG. 6) and sensing electrode lines RXL (refer to FIG. 6) may be disposed in the non-sensing area NSA. The non-sensing area NSA may surround at least a portion of the first and second sensing areas SA1 and SA2. A pad area may be disposed in the non-sensing area NSA. The pad area may be disposed on one side of the first and second sensing areas SA1 and SA2.

The first touch driver 310 may be electrically connected to the first touch array TA1 and the touch controller 330.

The first touch driver 310 may receive the frame synchronization signal from the touch controller 330. The first touch driver 310 may further receive the pulse synchronization signal from the touch controller 330. In addition, the first touch driver 310 may apply first touch driving signals to the first touch array TA1 in response to the frame synchronization signal. Here, the first touch driving signals may be generated using pulses of the pulse synchronization signal.

The first touch driver 310 may receive the sensing signal from the first touch array TA1. As an example, the first touch driver 310 may sense mutual capacitances of the (1_1)-th to (1_n)-th touch electrodes TX1_1 to TX1_$n$ and the (1_1)-th to (1_m)-th sensing electrodes RX1_1 to RX1_$m$ through the received sensing signals. For example, in the sensing area SA1, at least one of the mutual capacitances between the (1_1)-th to (1_n)-th touch electrodes TX1_1 to TX1_$n$ and the (1_1)-th to (1_m)-th sensing electrodes RX1_1 to RX1_$m$ may be changed according to the touch position of a user finger or the like. Accordingly, at least one of the received sensing signals may be changed. The first touch driver 310 may detect the touch position using a difference of such sensing signals.

The second touch driver 320 may receive the frame synchronization signal from the touch controller 330. The second touch driver 320 may further receive the pulse synchronization signal from the touch controller 330. The frame synchronization signal and the pulse synchronization signal may be signals equally applied to the first touch driver 310 and the second touch driver 320. In addition, the second touch driver 320 may also apply a second touch driving signal to the second touch array TA2 in response to the frame synchronization signal. Here, the second touch driving signal may be generated using the pulses of the pulse synchronization signal.

The second touch driver 320 may receive the sensing signal from the second touch array TA2. As an example, the second touch driver 320 may sense mutual capacitances of the (2_1)-th to (2_n)-th touch electrodes TX2_1 to TX2_$n$ and the (2_1)-th to (2_m)-th sensing electrodes RX2_1 to RX2_$m$ through the received sensing signals. For example, in the sensing area SA2, at least one of the mutual capacitances between the (2_1)-th to (2_n)-th touch electrodes TX2_1 to TX2_$n$ and the (2_1)-th to (2_m)-th sensing electrodes RX2_1 to RX2_$m$ may be changed according to the touch position of the user finger or the like. Accordingly, at least one of the received sensing signals may be changed. The second touch driver 320 may detect the touch position using a difference between such sensing signals.

Figure 6:
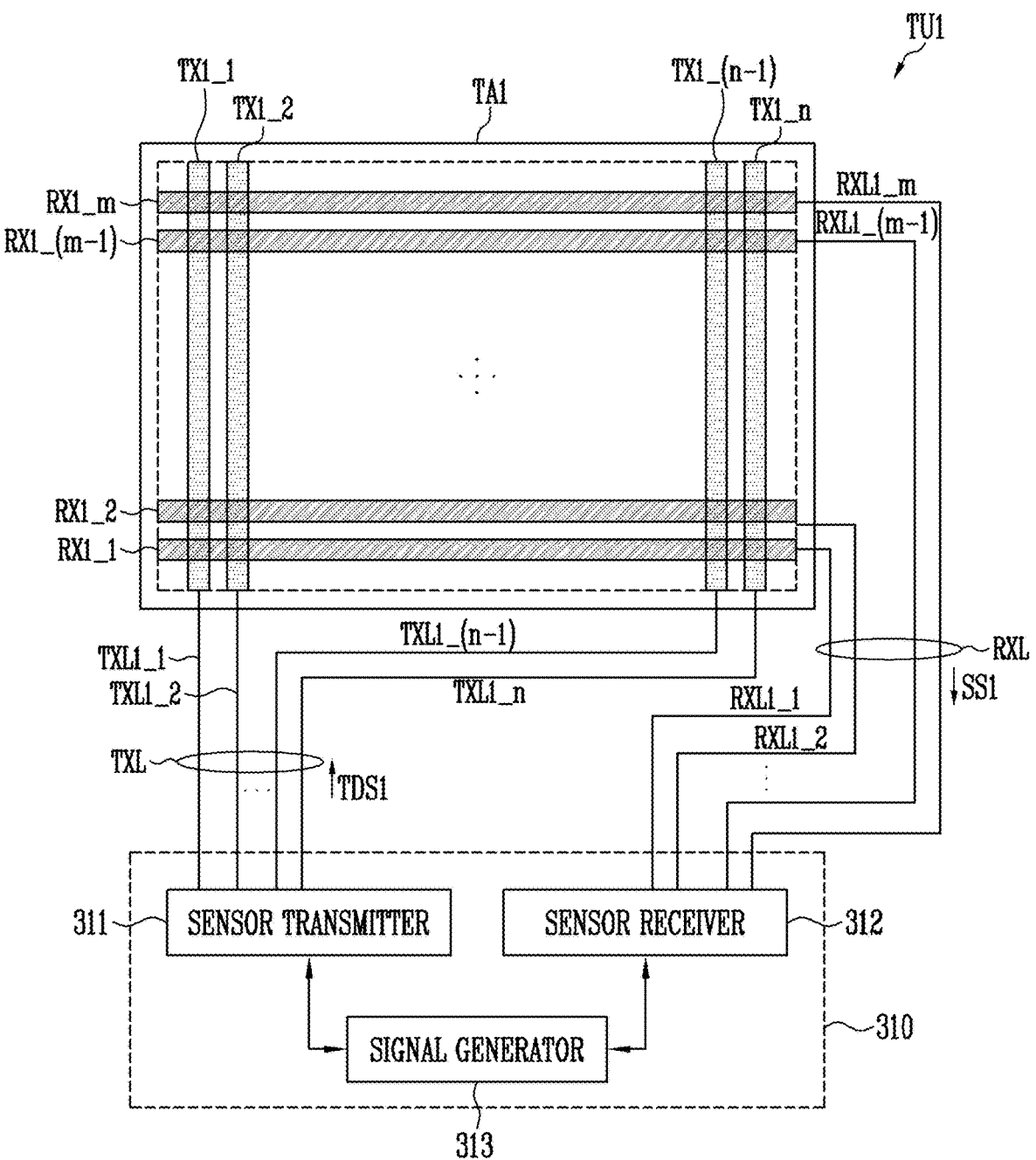
FIG. 6 is a block diagram illustrating an embodiment of one of the touch units of FIG. 5.

FIG. 6 is a block diagram illustrating an embodiment of one of the touch units of FIG. 5.

Referring to FIG. 6, the first touch unit TU1 may include the first touch array TA1 and the first touch driver 310. In addition, the first touch driver 310 may include a sensor transmitter 311, a sensor receiver 312, and a signal generator 313. Hereinafter, while the configurations of the first touch unit TU1 are described, these may be applied equally to the second touch unit TU2.

The sensor transmitter 311 may be connected to the (1_1)-th to (1_n)-th touch electrodes TX1_1 to TX1_$n$ and may supply first touch driving signals TDS1 to the (1_1)-th to (1_n)-th touch electrodes TX1_1 to TX1_$n$. According to an embodiment, the respective (1_1)-th to (1_n)-th touch electrodes TX1_1 to TX1_$n$ may be electrically connected to (1_1)-th to (1_n)-th touch electrode lines TXL1_1 to TXL1_$n$. In addition, the sensor transmitter 311 may be connected to the (1_1)-th to (1_n)-th touch electrodes TX1_1 to TX1_$n$ through the (1_1)-th to (1_n)-th touch electrode lines TXL1_1 to TXL1_$n$.

The sensor transmitter 311 may receive the first touch driving signals TDS1 from the signal generator 313. In addition, the sensor transmitter 311 may sequentially apply the first touch driving signals TDS1 to each of the (1_1)-th to (1_n)-th touch electrodes TX1_1 to TX1_$n$.

The sensor receiver 312 may be connected to the (1_1)-th to (1_m)-th sensing electrodes RX1_1 to RX1_$m$ and may receive first sensing signals SS1 from the (1_1)-th to (1_m)-th sensing electrodes RX1_1 to RX1_$m$. According to an embodiment, the respective (1_1)-th to (1_m)-th sensing electrodes RX1_1 to RX1_$m$ may be electrically connected to (1_1)-th to (1_m)-th sensing electrode lines RXL1_1 to RXL1_$m$. In addition, the sensor receiver 312 may be connected to the (1_1)-th to (1_m)-th sensing electrodes RX1_1 to RX1_$m$ through the (1_1)-th to (1_m)-th sensing electrode lines RXL1_1 to RXL1_$m$.

The sensor receiver 312 may include a plurality of sensor channels connected to the (1_1)-th to (1_m)-th sensing electrode lines RXL1_1 to RXL1_$m$. The sensor channels may receive the first sensing signals SS1 through the (1_1)-th to (1_m)-th sensing electrode lines RXL1_1 to RXL1_$m$. In an embodiment, the number of sensor channels of the sensor receiver 312 and the number of (1_1)-th to (1_m)-th sensing electrode lines RXL1_1 to RXL1_$m$ are the same, and the sensor channels of the sensor receiver 312 and the (1_1)-th to (1_m)-th sensing electrode lines RXL1_1 to RXL1_$m$ may be connected to each other one to one. In another embodiment, when the number of sensor channels of the sensor receiver 312 is less than the number of (1_1)-th to (1_m)-th sensing electrode lines RXL1_1 to RXL1_$m$, the sensor channels may be connected to the (1_1)-th to (1_m)-th sensing electrode lines RXL1_1 to RXL1_$m$ in a time-division manner through a multiplexer.

In addition, the sensor receiver 312 may receive and process (for example, demodulate, filtering, and the like) the first sensing signals SS1 of various frequencies. For example, the sensor receiver 312 may demodulate the first sensing signals SS1 using demodulation clock signals.

The signal generator 313 may receive the frame synchronization signal and the pulse synchronization signal from the touch controller 330 (refer to FIG. 5). The signal generator 313 may internally generate a basic clock signal based on the received signal and generate the first touch driving signals TDS1 to be synchronized to the basic clock signal. That is, the signal generator 313 may generate the first touch driving signals TDS1 including pulses. For example, the signal generator 312 may generate the first touch driving signals TDS1 in response to the frame synchronization signal using pulses of the pulse synchronization signal.

The signal generator 313 may be electrically connected to the sensor transmitter 311 and the sensor receiver 312. The signal generator 313 may supply the first touch driving signals TDS1 to the sensor transmitter 311 and supply the demodulation clock signals to the sensor receiver 312.

Figure 7:
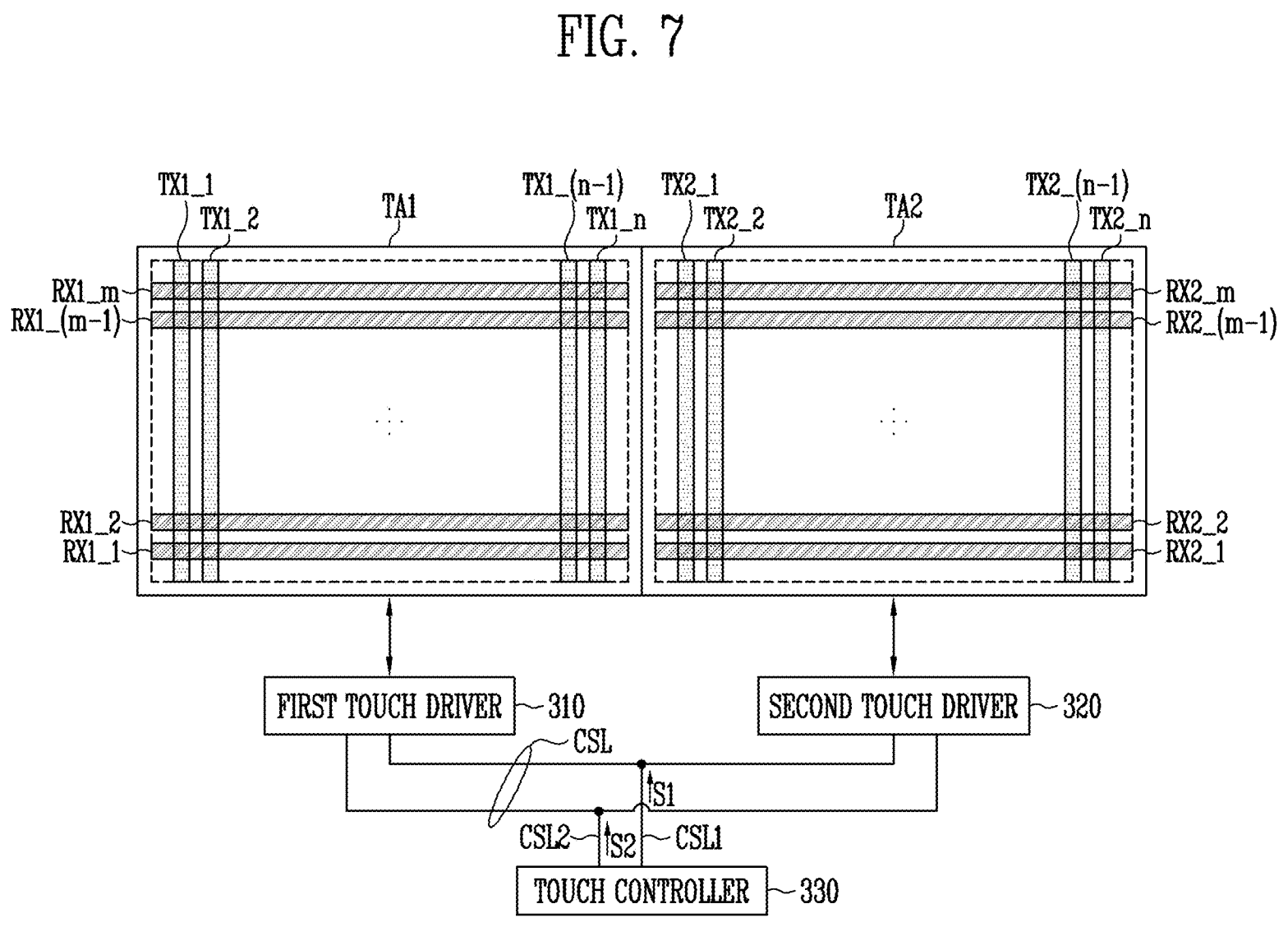

FIG. 7 is a block diagram illustrating an embodiment of a signal provided to the first and second touch drivers of FIG. 5.

Referring to FIG. 7, the display device DD may include one or more common lines CSL commonly connected to the first touch driver 310 and the second touch driver 320. In an embodiment, the common lines CSL include a first common line CSL1 transmitting a frame synchronization signal S1 and a second common line CSL2 transmitting a pulse synchronization signal S2.

The first and second touch drivers 310 and 320 may be commonly connected to the touch controller 330 through first and second common lines CSL1 and CSL2. The first and second touch drivers 310 and 320 may receive the frame synchronization signal S1 through the first common line CSL1. The first and second touch drivers 310 and 320 may receive the pulse synchronization signal S2 through the second common line CSL2. In an embodiment, the frame synchronization signal S1 and the pulse synchronization signal S2 are pulse signals having different periods.

The first and second touch drivers 310 and 320 may apply touch driving signals in response to the frame synchronization signal S1 received from the touch controller 330. The first and second touch drivers 310 and 320 may apply the touch driving signals in a frame period unit according to the frame synchronization signal S1. According to an embodiment, the first touch driver 310 may apply the first touch driving signal to the first touch array TA1 in response to the frame synchronization signal S1. The second touch driver 320 may apply the second touch driving signal to the second touch array TA2 in response to the frame synchronization signal S1. In particular, the first touch driving signal and the second touch driving signal may be synchronized by the frame synchronization signal S1 and generated for each common frame period.

The first and second touch drivers 310 and 320 may generate the touch driving signals using the pulse synchronization signal S2 received from the touch controller 330. The first and second touch drivers 310 and 320 may generate the touch driving signal generated using the pulse synchronization signal S2. According to an embodiment, the first touch driver 310 generates a first touch driving signal including pulses having a phase or a frequency determined based on the pulse synchronization signal S2. In addition, the second touch driver 320 may generate a second touch driving signal including pulses having a phase or a frequency determined based on the pulse synchronization signal S2. However, the pulses included in each of the first and second touch driving signals may be generated using pulses of the pulse synchronization signal S2, and may be set to have phases opposite to each other. A detailed content related to this is described later with reference to FIGS. 8 and 9.

Figure 8:
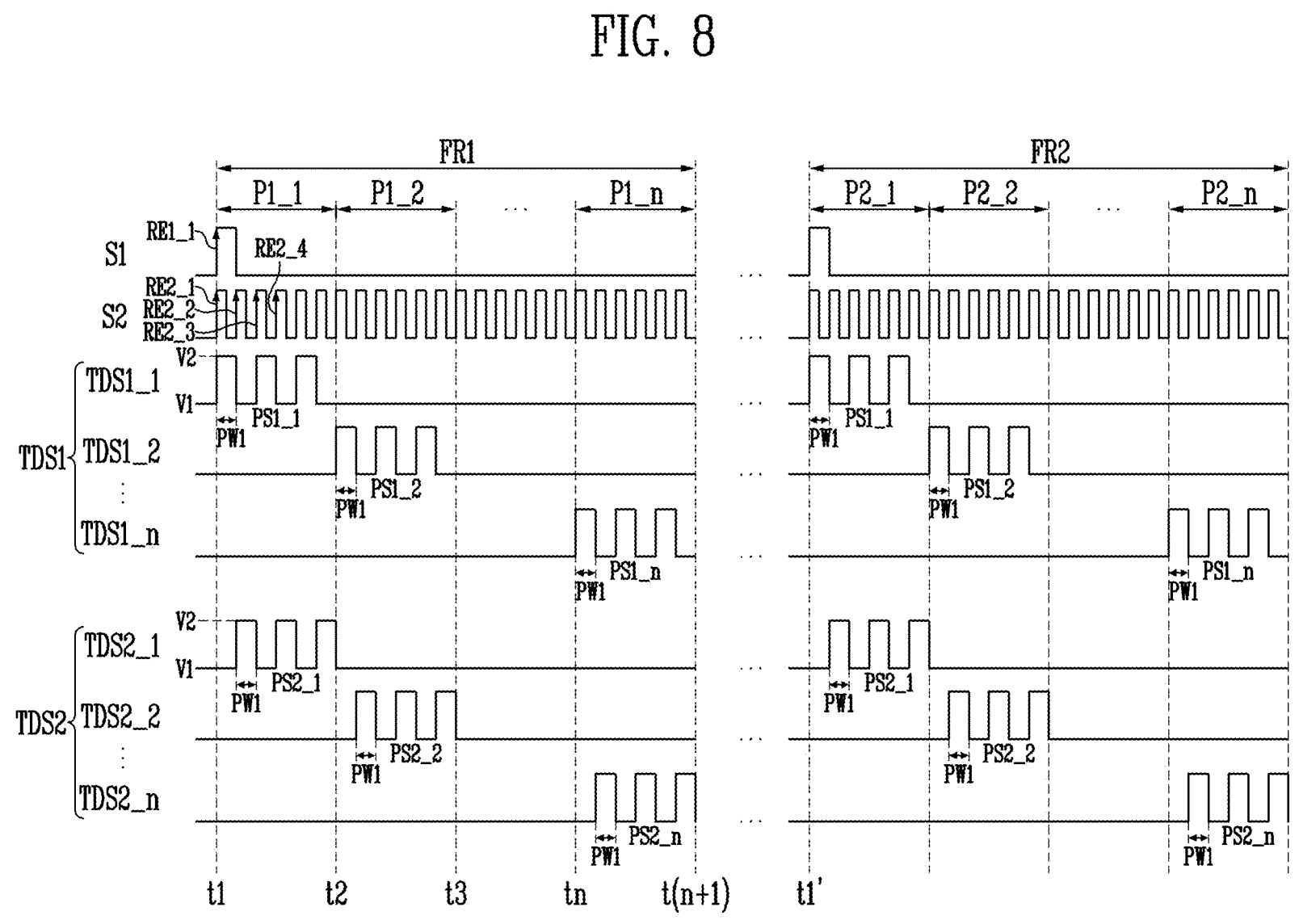

FIG. 8 is a timing diagram illustrating an embodiment of the first and second touch driving signals applied to the touch arrays of FIG. 7.

Referring to FIGS. 7 and 8, the display device DD may apply first touch driving signals TDS1 and second touch driving signals TDS2 in a frame period unit divided according to the frame synchronization signal S1.

The frame synchronization signal S1 is toggled at a period corresponding to the frame period. For example, a first time point t1 may be a time point when the frame synchronization signal S1 transitions to a high level and may correspond to a time point when a first frame period FR1 is started. In addition, a next first time point t1' may be a time point when the frame synchronization signal S1 transitions to a high level again, and may correspond to a time point when a second frame period FR2 is started. While in FIG. 8, a first rising edge RE1_1 of the frame synchronization signal S1 is shown as a start point of a frame period, a falling edge of the frame synchronization signal S1 may be the start time point of the frame period.

According to an embodiment, the first and second touch drivers 310 and 320 receive the frame synchronization signal S1 through the commonly connected first common line CSL1. In addition, the first and second touch drivers 310 and 320 may respectively apply the first touch driving signals TDS1 and the second touch driving signals TDS2 in the first frame period FR1 in response to the frame synchronization signal S1. In addition, the first and second touch drivers 310 and 320 may respectively apply the first touch driving signals TDS1 and the second touch driving signals TDS2 in the second frame period FR2 in response to the frame synchronization signal S1.

Here, the first touch driving signals TDS1 and the second touch driving signals TDS2 may include pulses toggled between a first voltage level V1 and a second voltage level V2. The first touch driving signals TDS1 may include (1_1)-th to (1_n)-th pulses PS1_1 to PS1_$n$. For example, the (1_1)-th to (1_n)-th pulses PS1_1 to PS1_$n$ may have the same amplitude and frequency. However, this is an example and embodiments are not limited thereto. In an embodiment, the (1_1)-th to (1_n)-th pulses PS1_1 to PS1_$n$ are respectively applied in (1_1)-th to (1_n)-th time periods P1_1 to P1_$n$ of the first frame period FR1, and do not overlap each other in time.

In addition, the second touch driving signals TDS2 may include (2_1)-th to (2_n)-th pulses PS2_1 to PS2_$n$. For example, the (2_1)-th to (2_n)-th pulses PS2_1 to PS2_$n$ may have the same amplitude and frequency. However, this is an example and embodiments are not limited thereto. In an embodiment, the (2_1)-th to (2_n)-th pulses PS2_1 to PS2_$n$ are respectively applied in the (1_1)-th to (1_n)-th time periods P1_1 to P1_$n$ of the first frame period FR1, and do not overlap each other in time.

Hereinafter, for convenience of description, only the first frame period FR1 is described, but the same description may also be applied to the second frame period FR2. For example, in (2_1)-th to (2_n)-th time periods P2_1 to P2_$n$ of the second frame period FR2, the (1_1)-th to (1_n)-th pulses PS1_1 to PS1_$n$ may be respectively applied as (1_1)-th to (1_n)-th touch driving signals TDS1_1 to TDS1_$n$ of the first touch driving signals TDS1. In addition, in the (2_1)-th to (2_n)-th time periods P2_1 to P2_$n$ of the second frame period FR2, the (2_1)-th to (2_n)-th pulses PS2_1 to PS2_$n$ may be respectively applied as (2_1)-th to (2_n)-th touch driving signals TDS2_1 to TDS2_$n$ of the second touch driving signals TDS2.

Referring to FIGS. 7 and 8, in the first frame period FR1, the (1_1)-th to (1_n)-th touch driving signals TDS1_1 to TDS1_$n$ of the first touch driving signals TDS1 may be respectively applied to the (1_1)-th to (1_n)-th touch electrodes TX1_1 to TX1_$n$ of the first touch array TA1. In the (1_1)-th to (1_n)-th time periods P1_1 to P1_$n$, the (1_1)-th to (1_n)-th touch driving signals TDS1_1 to TDS1_$n$ may be sequentially applied, respectively. For example, during a first time period P1_1 corresponding to the first time point t1 to a second time point t2, the (1_1)-th touch driving signal TDS1_1 including the (1_1)-th pulses PS1_1 may be applied to the (1_1)-th touch electrode TX1_1. During a second time period P1_2 corresponding to the second time point t2 to a third time point t3, the (1_2)-th touch driving signal TDS1_2 including the (1_2)-th pulses PS1_2 may be applied to the (1_2)-th touch electrode TX1_2. In addition, during an n-th time period P1_$n$ corresponding to an n-th time point tn to an (n+1)-th time point t(n+1), the (1_n)-th touch driving signal including the (1_n)-th pulses PS1_$n$ TDS1_$n$ may be applied to the (1_n)-th touch electrode TX1_$n$.

In the first frame period FR1, the (2_1)-th to (2_n)-th touch driving signals TDS2_1 to TDS2_$n$ of the second touch driving signals TDS2 may be respectively applied to the (2_1)-th to (2_n)-th touch electrodes TX2_1 to TX2_$n$ of the second touch array TA2. In the (1_1)-th to (1_n)-th time periods P1_1 to P1_$n$, the (2_1)-th to (2_n)-th touch driving signals TDS2_1 to TDS2_$n$ may be sequentially applied, respectively. For example, during the first time period P1_1, the (2_1)-th touch driving signal TDS2_1 including the (2_1)-th pulses PS2_1 may be applied to the (2_1)-th touch electrode TX2_1. During the second time period P1_2, the (2_2)-th touch driving signal TDS2_2 including the (2_2)-th pulses PS2_2 may be applied to the (2_2)-th touch electrode TX2_2. In addition, during the n-th time period P1_$n$, the (2_n)-th touch driving signal TDS2_$n$ including the (2_n)-th pulses PS2_$n$ may be applied to the (2_n)-th touch electrode TX2_$n$.

According to an embodiment, the first and second touch drivers 310 and 320 receive the pulse synchronization signal S2 through the commonly connected second common line CSL2. The (1_1)-th to (1_n)-th touch driving signals TDS1_1 to TDS1_$n$ may be generated using the pulse synchronization signal S2. In addition, the (2_1)-th to (2_n)-th touch driving signals TDS2_1 to TDS2_$n$ may be generated using the pulse synchronization signal S2.

In an embodiment, based on the pulse synchronization signal S2, the pulses of the first touch driving signals TDS1 and the pulses of the second touch driving signals TDS2 have phases opposite to each other. For example, based on the pulse synchronization signal S2, the first touch driving signals TDS1 may transition from the first voltage level V1 to the second voltage level V2. At this time, the second touch driving signals TDS2 may transition from the second voltage level V2 to the first voltage level V1.

In an embodiment, during the first time period P1_1, the pulse synchronization signal S2 includes a (2_1)-th rising edge RE2_1, a (2_2)-th rising edge RE2_2, a (2_3)-th rising edge RE2_3, and a (2_4)-th rising edge RE2_4.

The (1_1)-th touch driving signal TDS1_1 may transition from the first voltage level V1 to the second voltage level V2 at odd-numbered rising edges of the pulse synchronization signal S2, for example, the (2_1)-th rising edge RE2_1 and the (2_3)-th rising edge RE2_3. The (1_1)-th touch driving signal TDS1_1 may transition from the second voltage level V2 to the first voltage level V1 at even-numbered rising edges of the pulse synchronization signal S2, for example, the (2_2)-th rising edge RE2_2 and the (2_4)-th rising edge RE2_4. The (1_1)-th pulses PS1_1 of the (1_1)-th touch driving signal TDS1_1 formed as described above may have a first pulse width PW1. The (1_2)-th to (1_n)-th touch driving signals TDS1_2 to TDS1_$n$ may be generated similarly to the (1_1)-th touch driving signal TDS1_1 during the (1_2)-th to (1_n)-th time periods P1_2 to P1_$n$.

The (2_1)-th touch driving signal TDS2_1 may transition from the first voltage level V1 to the second voltage level V2 at even-numbered rising edges of the pulse synchronization signal S2, for example, the (2_2)-th rising edge RE2_2 and the (2_4)-th rising edge RE2_4. The (2_1)-th touch driving signal TDS2_1 may transition from the second voltage level V2 to the first voltage level V1 at odd-numbered rising edges of the pulse synchronization signal S2, for example, the (2_3)-th rising edge RE2_3. The (2_1)-th pulses PS2_1 of the (2_1)-th touch driving signal TDS2_1 formed as described above may lag phases of the (1_1)-th pulses PS1_1 of the (1_1)-th touch driving signal TDS1_1 by 180 degrees. However, the (2_1)-th pulses PS2_1 of the (2_1)-th touch driving signal TDS2_1 may have the same first pulse width PW1 as the (1_1)-th pulses PS1_1. The (2_2)-th to (2_n)-th touch driving signals TDS2_2 to TDS2_$n$ may be generated similarly to the (2_1)-th touch driving signal TDS2_1 during the (1_2)-th to (1_n)-th time periods P1_2 to P1_$n$.

As described above, in an embodiment, the (2_1)-th to (2_n)-th pulses PS2_1 to PS2_$n$ included in the second touch driving signals TDS2 and the (1_1)-th to (1_n)-th pulses PS1_1 to PS1_$n$ included in the first touch driving signals TDS1 have phases opposite to each other.

Figure 9:
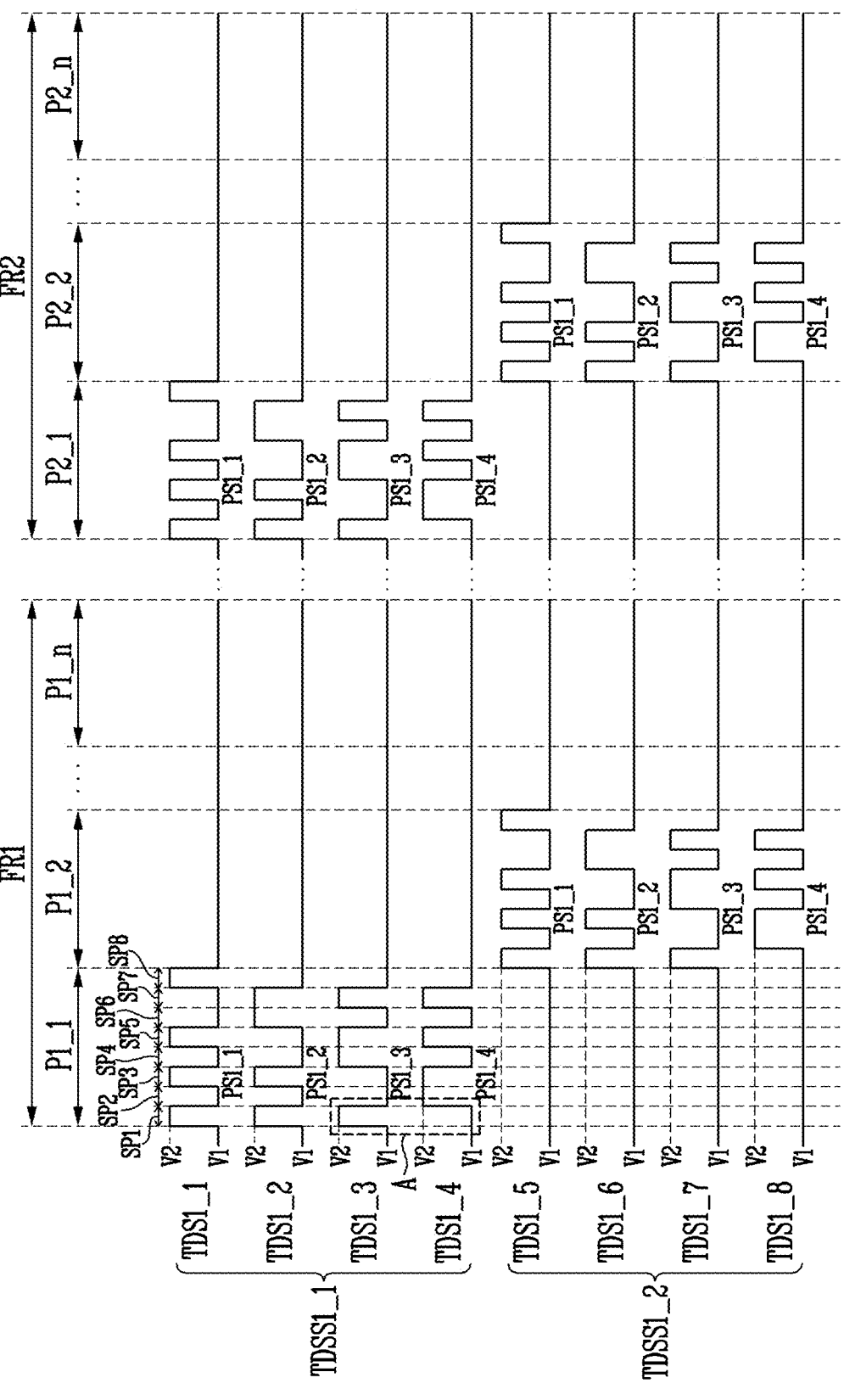
Figure 10:
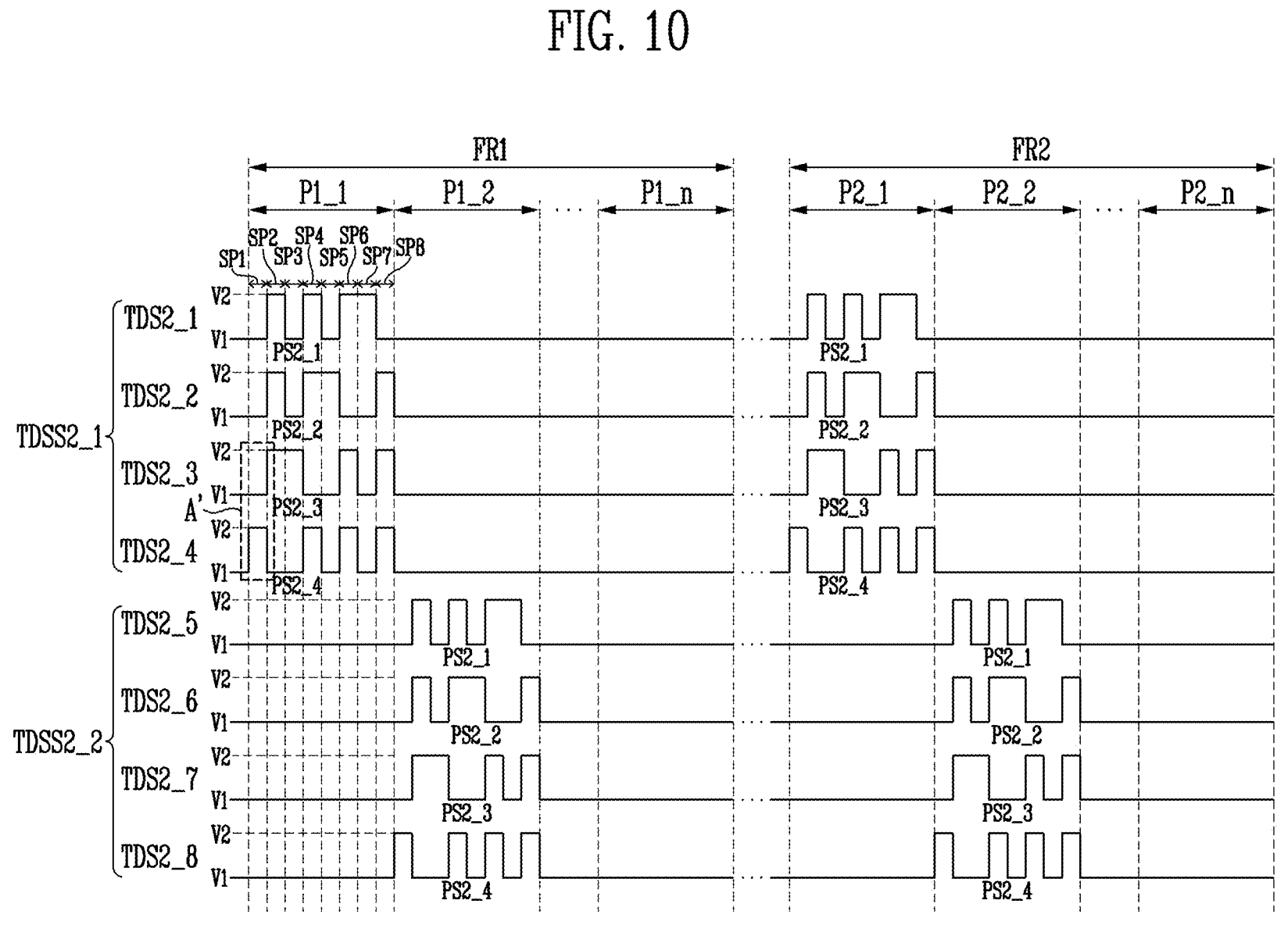

FIGS. 9 and 10 are timing diagrams illustrating an embodiment of the first and second touch driving signals applied to the touch arrays of FIG. 7. To avoid an overlapping description in relation to the embodiments of FIG. 8, differences from the above-described embodiment are mainly described.

Referring to FIGS. 7 and 9, the first frame period FR1 may include sequentially defined (1_1)-th to (1_n)-th time periods P1_1 to P1_$n$. In addition, the (1_1)-th to (1_n)-th touch electrodes TX1_1 to TX1_$n$ of the first touch array TA1 may be grouped into a plurality of touch electrode groups. In a time period corresponding to each touch electrode group, each touch electrode group may receive a set of touch driving signals. A set of touch driving signals of various types may be provided, and a touch may be sensed based on sensing signals received through the (1_1)-th to (1_m)-th sensing electrodes RX1_1 to RX1_$m$. The number of touch electrodes included in one touch electrode group and the number of touch driving signals forming one set may vary according to embodiments. For example, as described below, one touch electrode group may include four touch electrodes, and four touch driving signals may be applied to the touch electrode group as one set.

According to an embodiment, the first touch driving signal may include a (1_1)-th touch driving signal set TDSS1_1 corresponding to a set of (1_1)-th to (1_4)-th touch driving signals TDS1_1 to TDS1_4. In the (1_1)-th time period P1_1, the (1_1)-th to (1_4)-th touch driving signals TDS1_1 to TDS1_4 may include the (1_1)-th to (1_4)-th pulses PS1_1 to PS1_4, respectively. For example, the (1_1)-th to (1_n)-th pulses PS1_1 to PS1_n may be pulse signals of different types. However, this is an example and embodiments are not limited thereto. The (1_1)-th to (1_4)-th touch electrodes TX1_1 to TX1_4 included in the first touch electrode group may receive the (1_1)-th touch driving signal set TDSS1_1 during the (1_1)-th time period P1_1.

The first touch driving signal may include a (1_2)-th touch driving signal set TDSS1_2 corresponding to a set of (1_5)-th to (1_8)-th touch driving signals TDS1_5 to TDS1_8. In the (1_2)-th time period P1_2, the (1_5)-th to (1_8)-th touch driving signals TDS1_5 to TDS1_8 may respectively include the (1_1)-th to (1_4)-th pulses PS1_1 to PS1_4 equal to the (1_1)-th to (1_4)-th touch driving signals TDS1_1 to TDS1_4. The (1_5)-th to (1_8)-th touch electrodes TX1_5 to TX1_8 may receive the (1_2)-th touch driving signal set TDSS1_2 during the (1_2)-th time period P1_2. The first touch driving signal may be applied sequentially in the (1_3)-th to (1_n)-th time periods P1_3 to P1_n, as in the (1_1)-th and (1_2)-th time periods P1_1 and P1_2.

As described above with reference to FIG. 8, the (1_1)-th to (1_4)-th pulses PS1_1 to PS1_4 may be generated using the rising edge (or falling edge) of the pulses of the pulse synchronization signal S2. In addition, each of the (1_1)-th to (1_4)-th pulses PS1_1 to PS1_4 may be toggled between the first voltage level V1 and the second voltage level V2. For example, each of the (1_1)-th to (1_4)-th pulses PS1_1 to PS1_4 may have the first voltage level V1 or the second voltage level V2 in first to eighth sub-time periods SP1 to SP8 included in the (1_1)-th time period P1_1. Hereinafter, for convenience of description, only the (1_1)-th time period P1_1 is described, but the description may be applied similarly to the (1_2)-th to (1_n)-th time periods P1_1 to P1_n.

According to an embodiment, when one of the (1_1)-th to (1_4)-th touch driving signals TDS1_1 to TDS1_4 has the first voltage level V1 in each of the first to eighth sub-time periods SP1 to SP8, the remainder of the (1_1)-th to (1_4)-th touch driving signals TDS1_1 to TDS1_4 have the second voltage level V2. Alternatively, when one of the (1_1)-th to (1_4)-th touch driving signals TDS1_1 to TDS1_4 has the second voltage level V2, the remainder of the (1_1)-th to (1_4)-th touch driving signals TDS1_1 to TDS1_4 may have the first voltage level V1.

For example, in FIG. 9, as shown in A, in the first sub-time period SP1, the (1_4)-th pulses PS1_4 included in the (1_4)-th touch driving signal TDS1_4 may have the first voltage level V1. At this time, the (1_3)-th pulses PS1_3 included in the (1_3)-th touch driving signal TDS1_3 may have the second voltage level V2.

In a case of the (1_1)-th time period P1_1, the (1_1)-th to (1_4)-th pulses PS1_1 to PS1_4 may have the second voltage level V2, the second voltage level V2, the second voltage level V2, and the first voltage level V1, respectively. In the second sub-time period SP2, the (1_1)-th to (1_4)-th pulses PS1_1 to PS1_4 may have the first voltage level V1, the first voltage level V1, the first voltage level V1, and the second voltage level V2, respectively. In the third sub-time period SP3, the (1_1)-th to (1_4)-th pulses PS1_1 to PS1_4 may have the second voltage level V2, the second voltage level V2, the first voltage level V1, and the second voltage level V2, respectively. In the fourth sub-time period SP4, the (1_1)-th to (1_4)-th pulses PS1_1 to PS1_4 may have the first voltage level V1, the first voltage level V1, the second voltage level V2, and the first voltage level V1, respectively. In the fifth sub-time period SP5, the (1_1)-th to (1_4)-th pulses PS1_1 to PS1_4 may have the second voltage level V2, the first voltage level V1, the second voltage level V2, and the second voltage level V2, respectively. In the sixth sub-time period SP6, the (1_1)-th to (1_4)-th pulses PS1_1 to PS1_4 may have the first voltage level V1, the second voltage level V2, the first voltage level V1, and the first voltage level V1, respectively. In the seventh sub-time period SP7, the (1_1)-th to (1_4)-th pulses PS1_1 to PS1_4 may have the first voltage level V1, the second voltage level V2, the second voltage level V2, and the second voltage level V2, respectively. In addition, in the eighth sub-time period SP8, the (1_1)-th to (1_4)-th pulses PS1_1 to PS1_4 may have the second voltage level V2, the first voltage level V1, the first voltage level V1, and the first voltage level V1, respectively.

Accordingly, among the (1_1)-th to (1_4)-th pulses PS1_1 to PS1_4 applied in the (1_1)-th time period P1_1, pulses applied to neighboring touch electrodes may have different phases.

According to an embodiment, in the same sub-time period among the first to eighth sub-time periods SP1 to SP8, when one of the (1_1)-th to (1_4)-th pulses PS1_1 to PS1_4 has the first voltage level V1, the remainder of the (1_1)-th to (1_4)-th pulses PS1_1 to PS1_4 have the second voltage level V2. Alternatively, when one of the (1_1)-th to (1_4)-th pulses PS1_1 to PS1_4 has the second voltage level V2, the remainder of the (1_1)-th to (1_4)-th pulses PS1_1 to PS1_4 may have the first voltage level V1. That is, one of the (1_1)-th to (1_4)-th pulses PS1_1 to PS1_4 applied to the (1_1)-th time period P1_1 may have a phase opposite to that of the remainder at an arbitrary time point.

As described above, the (1_1)-th to (1_4)-th pulses PS1_1 to PS1_4 may be generated using the pulses of the pulse synchronization signal S2. In addition, one of the (1_1)-th to (1_4)-th pulses PS1_1 to PS1_4 generated as described above may have a phase opposite to remaining pulses in the same time period.

Referring to FIGS. 7 and 10, the (2_1)-th to (2_n)-th touch electrodes TX2_1 to TX2_n of the second touch array TA2 may receive the second touch driving signal in a time period corresponding to each touch electrode group.

According to an embodiment, the second touch driving signal includes a (2_1)-th touch driving signal set TDSS2_1 corresponding to a set of (2_1)-th to (2_4)-th touch driving signals TDS2_1 to TDS2_4. In the (1_1)-th time period P1_1, the (2_1)-th to (2_4)-th touch driving signals TDS2_1 to TDS2_4 may include (2_1)-th to (2_4)-th pulses PS2_1 to PS2_4, respectively. In addition, the (2_1)-th to (2_4)-th touch electrodes TX2_1 to TX2_4 included in the first touch electrode group may receive the (2_1)-th touch driving signal set TDSS2_1 during the (1_1)-th time period P1_1.

The second touch driving signal may include a (2_2)-th touch driving signal set TDSS2_2 corresponding to a set of (2_5)-th to (2_8)-th touch driving signals TDS2_5 to TDS2_8. In the (1_2)-th time period P1_2, the (2_5)-th to (2_8)-th touch driving signals TDS2_5 to TDS2_8 may respectively include the (2_1)-th to (2_4)-th pulses PS2_1 to PS2_4 equal to the (2_1)-th to (2_4)-th touch driving signals TDS2_1 to TDS2_4. In addition, the (2_5)-th to (2_8)-th touch electrodes TX2_5 to TX2_8 may receive the (2_2)-th touch driving signal set TDSS2_2 during the (1_2)-th time period P1_2. However, although not shown in FIG. 10, the second touch driving signal may be applied sequentially in the (1_3)-th to (1_n)-th time periods P1_3 to P1_*n*, as in the (1_1)-th and (1_2)-th time periods P1_1 and P1_2.

In an embodiment, the (2_1)-th to (2_4)-th pulses PS2_1 to PS2_4 included in the (2_1)-th to (2_4)-th touch driving signals TDS2_1 to TDS2_4 have phases opposite to those of the (1_1)-th to (1_4)-th pulses PS1_1 to PS1_4 (refer to FIG. 9) included in the (1_1)-th to (1_4)-th touch driving signals TDS1_1 to TDS1_4 (refer to FIG. 9).

According to an embodiment, the (1_1)-th to (1_4)-th pulses included in the (1_1)-th to (1_4)-th touch driving signals TDS1_1 to TDS1_4 (refer to FIG. 9) and the (2_1)-th to (2_4)-th pulses PS2_1 to PS2_4 included in the (2_1)-th to (2_4)-th touch driving signals TDS2_1 to TDS2_4 (refer to FIG. 9) have phases opposite to each other based on the pulse synchronization signal S2 (refer to FIG. 8). For example, based on the pulse synchronization signal S2, the (1_1)-th touch driving signal TDS1_1 may be generated to have the second voltage level V2, the first voltage level V1, the second voltage level V2, the first voltage level V1, the second voltage level V2, the first voltage level V1, the first voltage level V1, and the second voltage level V2 in the respective first to eighth sub-time periods SP1 to SP8. In addition, based on the pulse synchronization signal S2, the (2_1)-th touch driving signal TDS2_1 may have the first voltage level V1, the second voltage level V2, the first voltage level V1, the second voltage level V2, the first voltage level V1, the second voltage level V2, the second voltage level V2, and first voltage level V1 in the respective first to eighth sub-time periods SP1 to SP8.

When one of the (1_1)-th to (1_4)-th touch driving signals TDS1_1 to TDS1_4 has the first voltage level V1, one of the (2_1)-th to (2_4)-th touch driving signals TDS2_1 to TDS2_4 corresponding thereto may have the second voltage level V2. Simultaneously, the remainder of the (1_1)-th to (1_4)-th touch driving signals TDS1_1 to TDS1_4 may have the second voltage level V2, and remainder of the (2_1)-th to (2_4)-th touch driving signals TDS2_1 to TDS2_4 may have the first voltage level V1. For example, in FIG. 10, as shown in A', in the first sub-time period SP1, the (2_4)-th pulses PS2_4 included in the (2_4)-th touch driving signal TDS2_4 may have the second voltage level V2. At this time, the (2_3)-th pulses PS2_3 included in the (2_3)-th touch driving signal TDS2_3 may have the first voltage level V1.

Similarly to the (1_1)-th to (1_4)-th pulses PS1_1 to PS1_4, one of the (2_1)-th to (2_4)-th pulses PS2_1 to PS2_4 applied to the (1_1)-th time period P1_1 may have a phase opposite to that of the remainder at an arbitrary time point.

In a case of the (1_1)-th time period P1_1, in the first sub-time period SP1, the (2_1)-th to (2_4)-th pulses PS2_1 to PS2_4 may have the first voltage level V1, the first voltage level V1, the first voltage level V1, and the second voltage level V2, respectively. In the second sub-time period SP2, the (2_1)-th to (2_4)-th pulses PS2_1 to PS2_4 may have the second voltage level V2, the second voltage level V2, the second voltage level V2, and the first voltage level V1, respectively. In the third sub-time period SP3, the (2_1)-th to (2_4)-th pulses PS2_1 to PS2_4 may have the first voltage level V1, the first voltage level V1, the second voltage level V2, and the first voltage level V1, respectively. In the fourth sub-time period SP4, the (2_1)-th to (2_4)-th pulses PS2_1 to PS2_4 may have the second voltage level V2, the first voltage level V1, and the second voltage level V2, respectively. In the fifth sub-time period SP5, the (2_1)-th to (2_4)-th pulses PS2_1 to PS2_4 may have the first voltage level V1, the second voltage level V2, the first voltage level V1, and the first voltage level V1, respectively. In the sixth sub-time period SP6, the (2_1)-th to (2_4)-th pulses PS2_1 to PS2_4 may have the second voltage level V2, the first voltage level V1, the second voltage level V2, and the second voltage level V2, respectively. In the seventh sub-time period SP7, the (2_1)-th to (2_4)-th pulses PS2_1 to PS2_4 may have the second voltage level V2, the first voltage level V1, the first voltage level V1, and the first voltage level V1, respectively. In addition, in the eighth sub-time period SP8, the (2_1)-th to (2_4)-th pulses PS2_1 to PS2_4 may have the first voltage level V1, the second voltage level V2, the second voltage level V2, and the second voltage level V2, respectively.

In an embodiment, the (2_1)-th to (2_n)-th pulses PS2_1 to PS2_*n* included in the second touch driving signals TDS2 have a phase opposite to that of the (1_1)-th to (1_n)-th pulses PS1_1 to PS1_*n* included in the first touch driving signals TDS1.

As described above, the first touch driving signals TDS1 and the second touch driving signals TDS2 may be applied in a frame period unit divided according to the frame synchronization signal S1 received through the first common line CSL1. In addition, the pulses of the first touch driving signals TDS1 and the second touch driving signals TDS2 may have phases opposite to each other according to the pulse synchronization signal S2 received through the second common line CSL2. Accordingly, in the display device DD, by applying touch driving signals of phases opposite to each other to the first and second touch arrays TA1 and TA2, noise causing EMI interference that occurs when driving a panel set may be removed. Therefore, the display device DD may have more increased image quality and touch performance.

According to embodiments of the disclosure, a display device having increased quality is provided.

An effect according to embodiments is not limited to the content exemplified above, and further various effects are included in the present specification.

Although specific embodiments and application examples are described herein, other embodiments and modifications may be derived from the above description. Therefore, the spirit of the disclosure is not limited to these embodiments, and extends to the scope of the claims set forth below, various obvious modifications, and equivalents.

What is claimed is:

1. A display device comprising:

a first display panel;

a second display panel disposed adjacent to the first display panel;

a first touch array disposed on the first display panel;

a second touch array disposed on the second display panel;

a first touch driver that applies a first touch driving signal to the first touch array in response to a frame synchronization signal;

a second touch driver that applies a second touch driving signal to the second touch array in response to the frame synchronization signal; and a common line commonly connected to the first and second touch drivers to transmit the frame synchronization signal, wherein pulses included in the first touch driving signal and pulses included in the second touch driving signal have phases opposite to each other, wherein each of the pulses included in the first touch driving signal and each of the pulses included in the second touch driving signal are generated based on a rising edge or a falling edge of a pulse synchronization signal, and wherein generation of the pulses is initiated in response to a rising edge or a falling edge of the frame synchronization signal that transitions once per frame period to indicate a start of the frame period.

2. The display device according to claim 1, wherein the pulses included in the second touch driving signal lag the phases of the pulses included in the first touch driving signal by 180 degrees.

3. The display device according to claim 2, wherein the first and second touch driving signals have a same pulse width.

4. The display device according to claim 1, wherein each of the first and second touch driving signals include pulses toggled between a first voltage level and a second voltage level, and when the first touch driving signal transitions from the first voltage level to the second voltage level, the second touch driving signal transitions from the second voltage level to the first voltage level.

5. The display device according to claim 1, wherein the first touch array includes touch electrodes, the touch electrodes are divided into a plurality of touch electrode groups, the first touch driving signal includes a set of sub-touch driving signals, and each of the touch electrode groups receives the set of sub-touch driving signals in different time periods among a plurality of time periods.

6. The display device according to claim 5, wherein when one of the sub-touch driving signals has a first voltage level, remaining ones of the sub-touch driving signals has a second voltage level.

7. The display device according to claim 1, wherein the common line includes a first common line transmitting the frame synchronization signal and a second common line transmitting the pulse synchronization signal, and the first and second touch drivers receive the frame synchronization signal through the first common line and the pulse synchronization signal through the second common line.

8. The display device according to claim 7, wherein the first and second touch driving signals are generated using pulses of the pulse synchronization signal.

9. The display device according to claim 7, wherein the frame synchronization signal and the pulse synchronization signal are pulse signals with different periods.

10. The display device according to claim 1, wherein the first and second display panels are disposed side by side in a first direction or in a second direction different from the first direction to display one image.

11. A touch device comprising:

a first touch array;

a second touch array;

a first touch driver that applies a first touch driving signal to the first touch array in response to a frame synchronization signal;

a second touch driver that applies a second touch driving signal to the second touch array in response to the frame synchronization signal; and a common line commonly connected to the first and second touch drivers to transmit the frame synchronization signal, wherein pulses included in the first touch driving signal and pulses included in the second touch driving signal have phases opposite to each other, wherein each of the pulses included in the first touch driving signal and each of the pulses included in the second touch driving signal are generated based on a rising edge or a falling edge of a pulse synchronization signal, wherein generation of the pulses is initiated in response to a rising edge or a falling edge of the frame synchronization signal that transitions once per frame period to indicate a start of the frame period.

12. The touch device according to claim 11, wherein the pulses included in the second touch driving signal lag the phases of the pulses included in the first touch driving signal by 180 degrees.

13. The touch device according to claim 12, wherein the first and second touch driving signals have a same pulse width.

14. The touch device according to claim 11, wherein the common line includes a first common line transmitting the frame synchronization signal and a second common line transmitting the pulse synchronization signal, and the first and second touch drivers receive the frame synchronization signal through the first common line and receive the pulse synchronization signal through the second common line.

15. The touch device according to claim 14, wherein the first and second touch driving signals are generated using pulses of the pulse synchronization signal.

16. An electronic device comprising:

a display device including:

a first display panel;

a second display panel disposed adjacent to the first display panel;

a first touch array disposed on the first display panel;

a second touch array disposed on the second display panel;

a first touch driver that applies a first touch driving signal to the first touch array in response to a frame synchronization signal;

a second touch driver that applies a second touch driving signal to the second touch array in response to the frame synchronization signal, wherein when the first touch driving signal transitions from a first voltage level to a second voltage level, the second touch driving signal transitions from the second voltage level to the first voltage level, wherein each of the pulses included in the first touch driving signal transition from the first voltage level to the second voltage level based on a rising edge or a falling edge of a pulse synchronization signal, and wherein each of the pulses included in the second touch driving signal transition from the first voltage level to the second voltage level based on the rising edge or the falling edge of the pulse synchronization signal, and wherein generation of the pulses is initiated in response to a rising edge or a falling edge of the frame synchronization signal that transitions once per frame period to indicate a start of the frame period.

17. The electronic device according to claim 16, further comprising:

a common line commonly connected to the first and second touch drivers to transmit the frame synchronization signal.

18. The electronic device according to claim 16, wherein pulses included in the first touch driving signal and pulses included in the second touch driving signal have phases opposite to each other.

19. The electronic device according to claim 16, wherein the pulses included in the second touch driving signal lag the phases of the pulses included in the first touch driving signal by 180 degrees.

20. The electronic device according to claim 19, wherein the first and second touch driving signals have a same pulse width.

\* \* \* \* \*